United States Patent
Wineberg et al.

(10) Patent No.: US 6,282,282 B1
(45) Date of Patent: Aug. 28, 2001

(54) CALL CENTER OUTBOUND/INBOUND BALANCE SYSTEM

(75) Inventors: Jonathan M. Wineberg, Leesburg; Neil D. Pundit, Herndon; Arunachalam Ravichandran, Leesburg, all of VA (US)

(73) Assignee: SER Solutions, Inc., Herndon, VA (US)

( * ) Notice: Subject to any disclaimer, the term of this patent is extended or adjusted under 35 U.S.C. 154(b) by 0 days.

(21) Appl. No.: 09/143,536

(22) Filed: Aug. 28, 1998

Related U.S. Application Data

(63) Continuation-in-part of application No. 09/038,964, filed on Mar. 12, 1998, now abandoned.

(51) Int. Cl.⁷ .......................... H04M 3/523; H04M 3/44; H04Q 3/64
(52) U.S. Cl. .......................... 379/265; 379/216; 379/266
(58) Field of Search .......................... 379/265, 266, 379/309, 216

(56) References Cited

U.S. PATENT DOCUMENTS 5,519,773 * 5/1996 Dumas et al. .................. 379/265
5,815,566 * 9/1998 Ramot et al. .................. 379/265

* cited by examiner

Primary Examiner—Harry S. Hong
(74) Attorney, Agent, or Firm—Andrew C. Aitken; Venable

(57) ABSTRACT

An inbound/outbound balancing system transfers agents based on a predicted future inbound average call waiting time. In one embodiment of the invention, the future average call waiting time is predicted to be the then sampled average call waiting time times the slope (i.e. rate of change) in average call waiting time between the current sample and the next previous sample. Based upon the predicted call waiting time, a determination is made whether or not agents should be added or deleted to maintain the inbound performance parameter within an acceptable range. The direction of change in call waiting time (i.e. increasing or decreasing); the rate at which it is changing, and the duration of the predicted average call waiting time relative to the boundaries of a range area used to determine whether or not to reassign blend agents and if reassigned, how many to reassign.

1 Claim, 5 Drawing Sheets

CALL CENTER OUTBOUND/INBOUND BALANCE SYSTEM

CROSS REFERENCE TO RELATED APPLICATION

This is a continuation in part of application No. 09/038,964 filed Mar. 12, 1998 entitled "Call Center Inbound Blending System," now abandoned.

BACKGROUND OF THE INVENTION

1 Field of the Invention

This invention relates to an improved system for integrating automatic outbound dialer functions with automatic call distribution functions, and more particularly to a system that balances the number of agents assigned to these functions while maintaining the inbound call waiting time within prescribed limits.

2 Description of the Prior Art

Many call centers provide both an automatic inbound telephone call distribution function and an automatic outbound call function. As will be appreciated by those skilled in the art, there have been proposals in the prior art to link inbound automatic call distribution and automatic outbound calling in order to improve staffing efficiency. Inbound call distribution typically has peaks and valleys in its load, since the demand is generated by outside callers. By linking inbound and outbound call functions, outbound agents can be switched to inbound duty during peak inbound demand periods and switched back to outbound duty during slack periods in inbound demand, thus improving overall staffing efficiency.

In a typical prior art system, an inbound performance parameter is monitored based upon statistics tracked by the inbound call distributor; for example, number of calls in the inbound queue or average time to answer an inbound call. Target values, and upper and lower thresholds are established for the inbound performance parameter; for example a five second target to respond to incoming calls with an upper threshold of seven seconds and a lower threshold of three seconds. The assumptions of the thresholds is; if upper threshold is exceeded, the performance is unacceptable and more inbound agents are needed; and (b) if the lower threshold is exceeded, the inbound function is considered to be overstaffed and overall efficiency would be improved by transferring inbound agents to outbound operations.

In the prior art, so called blend agents are typically transferred, as they become available, when the upper or lower threshold values are exceeded. Agents continue to be transferred until the performance is between the upper and lower threshold limits, when the transfer stops. U.S. Pat. No. 5,425,093, assigned to the assignee of this application and incorporated herein by reference, discloses the concept of providing hysteresis to provide added stabilization to agent transfer. With hysteresis, a higher threshold value is used to trigger the transfer of agents as the upper range of acceptable performance is being exceeded than the threshold value used to stop transfer as the performance moves toward the acceptable range. Similarly for the lower limit; the trigger value to start transfer is lower as measured performance leaves the range than to stop transfer as the performance moves toward the range. However, this and other prior art call center balance algorithms for determining the transfer of agents between inbound and outbound functions operate in response to current inbound performance, and have not proven to be altogether satisfactory in operation.

SUMMARY OF THE INVENTION

An object of this invention is the provision of a call center inbound/outbound balance system that transfers agents based upon predicted inbound call waiting time.

Still another object of the invention is the provision of a call center inbound/outbound balance system that is independent of any specific call center hardware and software so that it can be used with most, and perhaps all, call centers having inbound and outbound functions.

Briefly, this invention contemplates the provision of an inbound/outbound balancing system in which agents are transferred based on a predicted future inbound average call waiting time. In one embodiment of the invention, the future average call waiting time is predicted to be the then sampled average call waiting time times the slope (i.e. rate of change) in average call waiting time between the current sample and the next previous sample. Based upon the predicted call waiting time, a determination is made whether or not agents should be added or deleted to maintain the inbound performance parameter within an acceptable range. The direction of change in call waiting time (i.e. increasing or decreasing); the rate at which it is changing, and the duration of the predicted average call waiting time relative to the boundaries of a range are used to determine whether or not to reassign blend agents and if reassigned, how many to reassign.

BRIEF DESCRIPTION OF THE DRAWINGS

The foregoing and other objects, aspects and advantages will be better understood from the following detailed description of a preferred embodiment of the invention, in which.

DETAILED DESCRIPTION OF A PREFERRED EMBODIMENT

Figure 1:
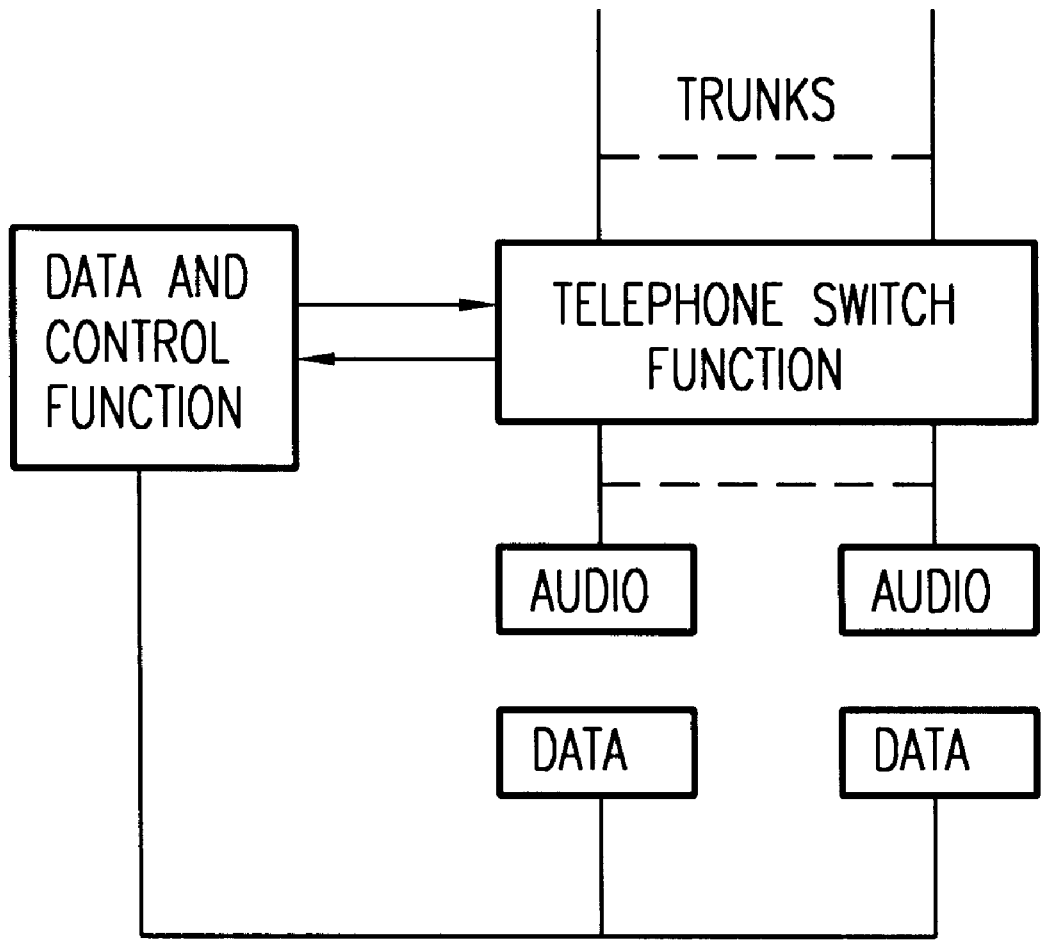
FIG. 1 is a diagram of a typical commercial inbound/outbound call center system with which the blending method of this invention can be used advantageously.

Aforementioned U.S. Pat. No. 5,425,093 illustrates one prior art inbound/outbound call center system with blended operations. The call center system shown in that patent contemplates separate inbound and outbound functions, which control respectively separate inbound and outbound switches. The blending system of this invention can be implemented advantageously in such systems with separate inbound and outbound functions. In fact, as will become apparent to those skilled in the art, the system of this invention is independent of any particular call center hardware or architecture, and can be used advantageously in all call center systems. Here it should be noted, the current trend in call center systems is to add software modules to the inbound call distributor system so that the inbound call distributor performs both inbound and outbound functions including the blending function to which this invention is directed. FIG. 1 is a simplified block diagram illustrating a call center system in which a commercially available automatic call distributor includes application programs to allow it to perform both inbound and outbound functions, including the agent blending function, which is the subject of this invention. Here it will be appreciated, most (if not all) commercially available automatic call distributors keep and make available average inbound call waiting statistics.

Figure 2A:
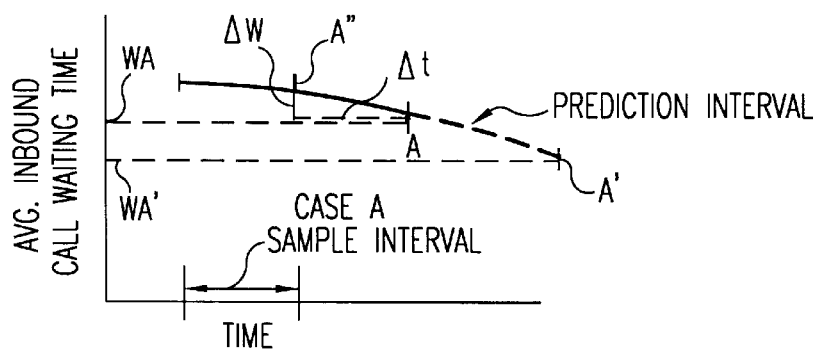
FIG. 2a shows a historic trace of inbound call waiting vs. elapsed time and a projection of call waiting time in the near future based on the trace where the inbound call waiting time is projected to decrease.
Figure 2B:
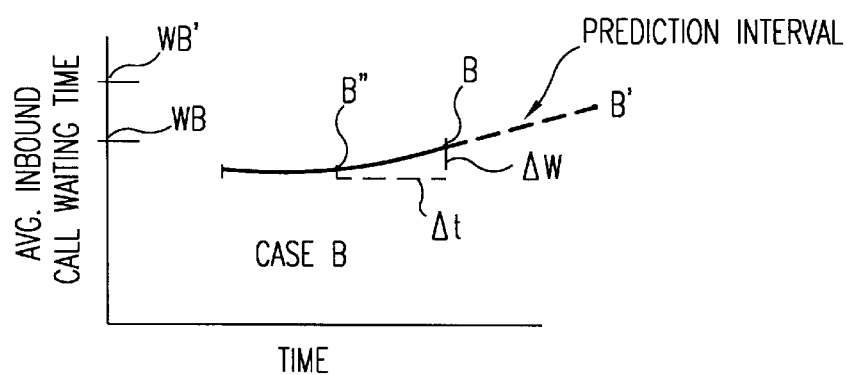
FIG. 2b shows a historic trace of inbound call waiting vs. elapsed time and a projection of call waiting time in the near future based on the trace where the inbound call waiting time is projected to increase.
Figure 2C:
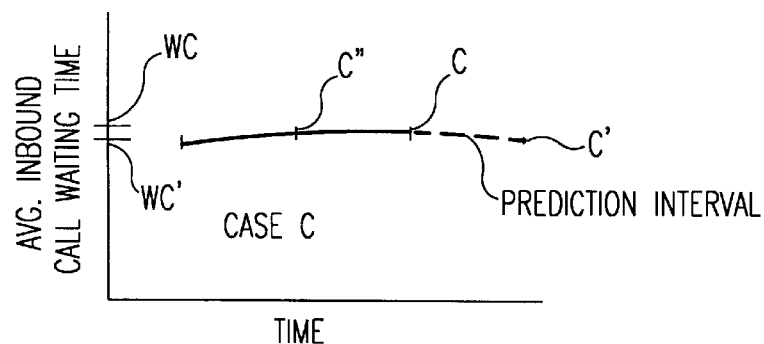
FIG. 2c shows a historic trace of inbound call waiting vs. elapsed time and a projection of call waiting time in the near future based on the trace where the inbound call waiting time is projected to remain substantially unchanged.

Referring now to FIG. 2, it shows three illustrative cases (labeled A, B, and C,) of inbound call wait time traces and the projection of these traces into the future. The dashed line portion of each trace is the projection of the trace into a short future interval. The projected wait times at the end of the future interval are labeled respectively WA', WB', and WC'. The wait times at the point in time when the prediction is made are labeled WA, WB, and WC. Using samples of inbound call wait times, any of a number of suitable routines known in the art can be used to predict the future wait time. In the specific embodiment, the future wait time is predicted by multiplying the current sample (WA, WB, or WC) by the slope (i.e. rate of change) between the current sample and the next previous sample WA", WB" or WC". The rate of change is equal to the change ($\Delta A$, $\Delta B$ or $\Delta C$) between A, B and C and A", B" and C" respectively divided by the time interval ($\Delta t$) between samples, for example:

predicted average call wait $WA'=WA+(WA \cdot \Delta WA/\Delta t)$· predict interval In another prediction routine, weighted values of the wait time at the current sample and the weighted accumulation of samples values from the start of operation are used. The weighting term $\underline{a}$ is used to apportion the relative significance of immediate and historic values. The weighting term $\underline{a}$ may be assigned based on empirical data, and ranges between 0 and +1 (both included). The predicted value for the next sample $V_{n+1}$ is obtained by multiplying $\underline{a}$ times the actual value of the last sample period ($t_N$) and ($1-\underline{a}$) times the predicted value ($V_N$) for the last sample period, namely:

$V_{N+1}=at_N+(1-a)V_N$

The frequency at which the computation is made in order to determine whether or not blend agents should be transferred from outbound to inbound or vice versa should be approximately equal the greater of the following three values: the average time it takes to transfer an agent; or approximately one second; or T/10. If T is much larger than the time it takes to transfer an agent, the T/10 value should not be considered.

Figure 3:
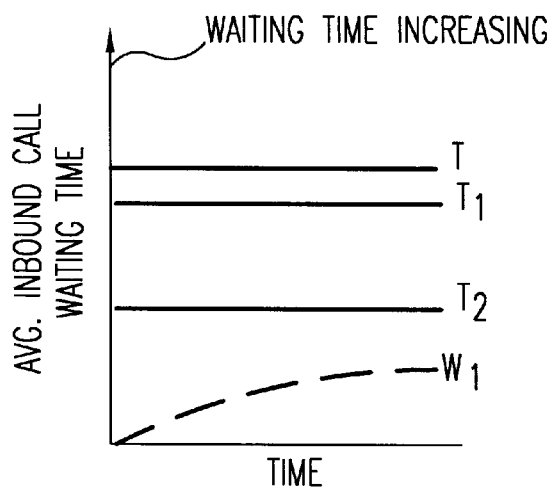
FIG. 3 is a graphic depiction of target wait time and target wait time limits.
Figure 4:
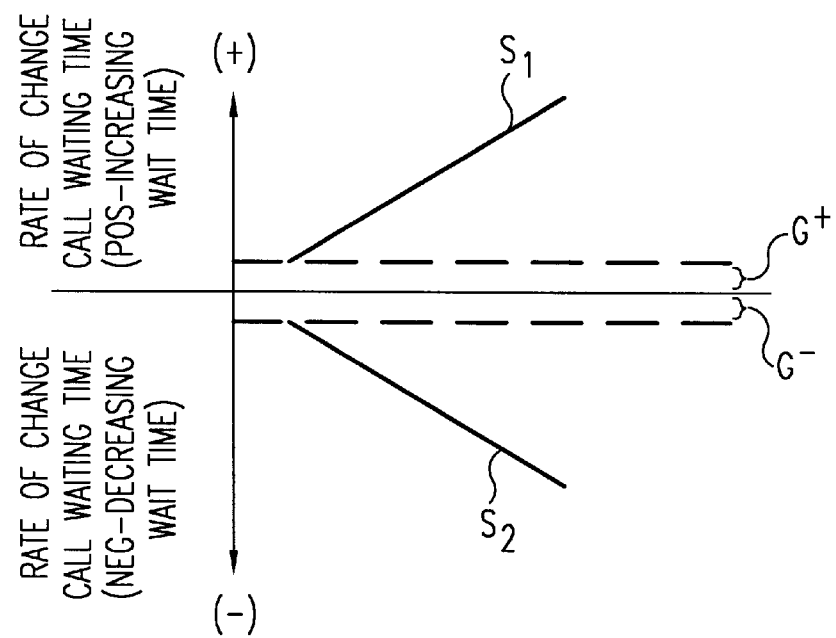
FIG. 4 is a graphic illustration of the wait time slope boundaries.

Referring now to FIGS. 3 and 4 they illustrate the steps in determining the apportionment of blend agents between outbound and inbound in order to maintain the inbound wait time within an acceptable range. The average call waiting time (W) is the average time (in seconds) between the time a call is answered by the inbound call distribution and the time the caller is connected to an agent. In the diagram of FIG. 3 the upper limit T of the call wait time is set by the call center. Exceeding (i.e. rising above) the upper limit T is an undesirable call center operation because it keeps callers waiting too long. In accordance with this invention a band beneath T is established, and the system attempts to maintain the wait time within this band. In FIG. 3, the band is between $T_1$ and $T_2$. Exceeding (i.e. dropping below) the lower limit $T_2$ is an undesirable call center operation because it makes inefficient use of the available agents. Here it will be appreciated that having a band of acceptable performance between upper and lower limits discourages indiscriminate transfer of agents.

The target average wait time T should be chosen so that the wait time of any individual call is below the desired upper limit for individual calls. That is, if it is desired that each call be answered within 10 seconds to a 98% probability, then the average wait time should be determined so as to provide a high probability that no individual call will exceed the desired limit (in this example 10 seconds). For example, T could be chosen to be equal to the average wait time plus three times the standard deviation of the wait time or 1.1 times the average wait time when the standard deviation is very small compared to the average. The threshold values $T_1$ and $T_2$ are established as shown in FIG. 3 such that $T_1$ and $T_2$ is less than T. If the target wait time is zero, T can be set to about 5 seconds, $T_1$ to 3 seconds and $T_2$ to one second. In general, $T_1$ is advantageously approximately 95% of T and $T_2$ is approximately 90% of T. For large values of T, $T_1$ can be set to equal T minus a constant K and $T_2$ equal to T minus 2K.

The percentage of available blend agents to be transferred is a function of where the predicted average wait time falls relative to the band between $T_1$ and $T_2$, and the slope (or rate) and direction of the change in predicted average wait time. As illustrated in FIG. 4, a narrow band G is defined around the zero slope such that any predicted change in average call waiting time at a rate within this band G is considered as zero change. A rate of change $S_1$ is defined as a positive value (i.e. wait time increasing) with a slope such that, in response to positive change in average wait time at a rate greater than $S_1$, all available dual agents are transferred to the inbound function under certain circumstances. Whether or not agents are in fact transferred depends upon where the predicted average wait time is situated relative to the band established between $T_1$ and $T_2$. Similarly, a rate of change of $S_2$ is defined as a negative value (i.e. wait time decreasing) with a slope such that, in response to negative change in average wait time at a rate greater than $S_2$, all available agents are transferred to the outbound function in certain circumstances. Again, whether agents are in fact transferred depends upon where the predicted average wait time is situated relative to the band established between $T_1$ and $T_2$.

Referring back to FIG. 3, if the predicted wait time is equal to or less than $T_2$ ($W_1$) and the slope of the change is positive (i.e. wait time increasing), no agents are transferred to the inbound function since the predicted wait time is increasing and the wait time will, if the trend continues, reach $T_2$. If the predicted wait time is equal to or less than $T_2$ and the slope of the change is negative (i.e. wait time decreasing) agents are transferred from inbound to outbound. The number of agents to be transferred is advantageously equal to the ratio of the actual slope (S) to the negative limiting slope $S_2$ times the number of dual agents then available for transfer. The number of dual agents available for transfer is, in general, the number of dual agents assigned to a compare less the number already assigned to the function to which additional agents are to be transferred. Of course, agents are actually transferred only as they complete any call in which they were engaged.

If the predicted average wait time is within the band between $T_1$ and $T_2$ (i.e. less than $T_1$ but greater than $T_2$) and the slope S is negative, no blend agents are transferred since if the trend continues the wait time will decrease to $T_2$ triggering a transfer of agents. If the predictive average wait time is between $T_1$ and $T_2$ and the slope S is positive, agents are transferred from outbound to inbound. The number of agents is determined by the ratio of the positive slope S to the value $S_1$ times the number of dual agents available. If the predicted wait time exceeds $T_1$, all available dual agents are transferred to inbound operations and an alarm message is sent to the call center supervisor.

Figure 5:
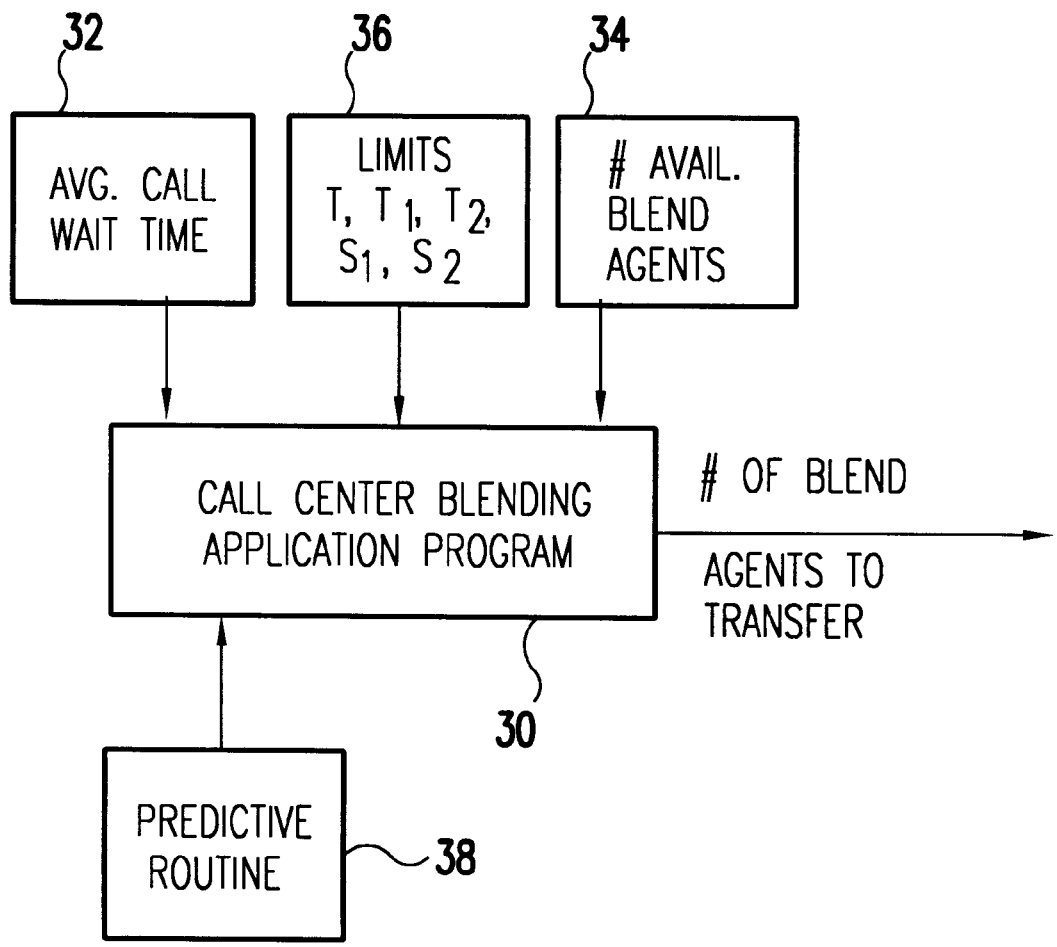
FIG. 5 is a functional block diagram of the inbound/outbound call blending system of this invention.

Referring now to FIG. 5, the call center blending application program 30 of this invention receives from the automatic call distributor (not shown) a periodic input 32 indicating the average inbound call wait time and a periodic input 34 indicating the number of blend agents that are available for assignment to inbound and/or outbound operation. The call center manager provides inputs 36 which establish the parameters T, $T_1$, $T_2$, $S_1$ and $S_2$. A suitable predicted routine 38 is provided to predict the average call wait, as explained in connection with FIG. 2. The output of the call center blending application program 30 is a digital signal indicating the number of blend agents to be transferred between outbound and inbound operations at the end of each sample period in order to maintain the average wait time at a relatively constant level between the limits of $T_1$ and $T_2$.

Figure 6:
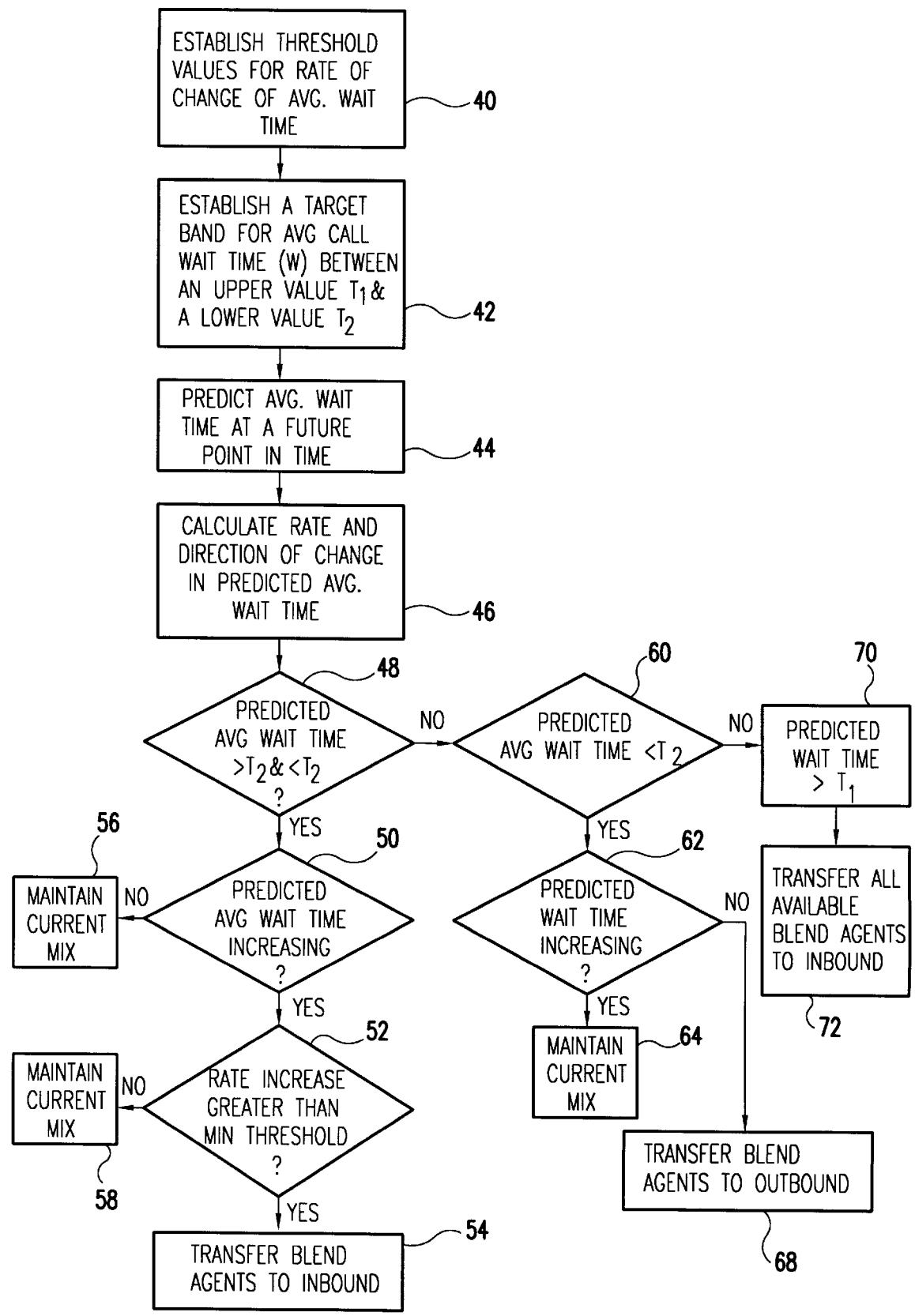
FIG. 6 is a flow diagram of the operation of the call blending system of this invention.

Referring now to FIG. 6, at block 40, threshold values for $S_1$, $S_2$ rate are established as explained in connection with FIG. 4. Similarly, at block 42, the values of $T_1$ and $T_2$ are established, as explained in FIG. 3. In operation, the average wait time at a future point in time is determined at block 44 in the manner explained in FIG. 2, and the rate and direction of change in predicted wait time is calculated at block 46 in the manner also explained in connection with FIG. 2.

At decision block 48, a process is started to determine the location of the predicted average call wait time with respect to the limits $T_1$ and $T_2$. If the predicted average call wait time is greater than $T_2$ and less than $T_1$, and the predicted average wait time is increasing at a rate greater than a minimum threshold value (G) (decision blocks 50 and 52), blend agents are transferred to inbound operation, block 54. If the predicted average wait time is decreasing the then-current mix of inbound and outbound agents is maintained, block 56. Similarly, if the rate of increase is less than the minimum threshold, the mix is also maintained, block 58.

If the predicted average wait time is less than $T_2$ (block 60), and the predicted wait time is increasing (block 62), the current mix of inbound and outbound agents is maintained, block 64. If the predicted wait time is not increasing, blend agents are transferred to outbound operation, block 68.

If the predicted average wait time is greater than $T_1$, block 70, then all available blend agents are transferred to inbound operation, block 72.

While the invention has been described in terms of a single preferred embodiment, those skilled in the art will recognize that the invention can be practiced with modification within the spirit and scope of the appended claims.

Having thus described our invention, what we claim as new and desired to secure by Letters Patent is as follows:

1. A method for determining a number of blend agents to transfer between concurrently running inbound operation and outbound operation in response to changes in the rate at which inbound calls are received, including the steps of:

establishing a target band of waiting time for inbound calls;

periodically predicting the waiting time for inbound calls;

determining the direction and rate of change in predicted waiting time for inbound calls;

if the predicted waiting time for inbound calls is within said target band and the waiting time is increasing, generating a signal for transferring blend agents to inbound operation, with the number of agents to be transferred determined as a function of the rate of increase; and if the predicted waiting time for inbound calls is less than the lower limit of said band and the predicted waiting time is decreasing, generating a signal for transferring blend agents to outbound operation.

* * * * *